(12) United States Patent
Lemieux et al.

(10) Patent No.: US 12,400,240 B2
(45) Date of Patent: Aug. 26, 2025

(54) INTERACTIVE CONJOINT ENVIRONMENT

(71) Applicant: GM Global Technology Operations LLC, Detroit, MI (US)

(72) Inventors: James Lemieux, Royal Oak, MI (US); Peiling Wu-Smith, Rochester Hills, MI (US); Kurt R. Schmitter, Pinckney, MI (US); Ravi S. Sambangi, Rochester Hills, MI (US); Kathryn Schumacher, Pleasant Ridge, MI (US); Jonathan H. Owen, Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 225 days.

(21) Appl. No.: 18/154,362

(22) Filed: Jan. 13, 2023

(65) Prior Publication Data
US 2024/0242236 A1 Jul. 18, 2024

(51) Int. Cl.
| | |
|---|---|
| *G06Q 10/00* | (2023.01) |
| *G06F 3/01* | (2006.01) |
| *G06Q 30/0203* | (2023.01) |
| *G06V 40/16* | (2022.01) |
| *G06V 40/18* | (2022.01) |
| *G08B 7/06* | (2006.01) |

(52) U.S. Cl.
CPC ......... *G06Q 30/0203* (2013.01); *G06F 3/013* (2013.01); *G06V 40/171* (2022.01); *G06V 40/18* (2022.01); *G08B 7/06* (2013.01)

(58) Field of Classification Search
None
See application file for complete search history.

(56) References Cited

U.S. PATENT DOCUMENTS

| | | | | |
|---|---|---|---|---|
| 5,808,908 | A  * | 9/1998 | Ghahramani | G06Q 10/06375 |
| | | | | 702/182 |
| 7,253,817 | B1 * | 8/2007 | Plantec | G09B 7/00 |
| | | | | 345/473 |
| 8,589,140 | B1 * | 11/2013 | Poulin | G06F 8/30 |
| | | | | 703/22 |
| 12,033,169 | B1 * | 7/2024 | Karty | G06Q 30/0203 |
| 2004/0143481 | A1 * | 7/2004 | Li | G06Q 10/101 |
| | | | | 705/7.32 |
| 2007/0233730 | A1 * | 10/2007 | Johnston | G06Q 30/02 |
| 2010/0070345 | A1 * | 3/2010 | Abelow | G06Q 30/0203 |
| | | | | 705/14.44 |

(Continued)

OTHER PUBLICATIONS

S Radas, D Prelec (Predicted preference conjoint analysis)—PLoS one, 2021—journals.plos.org (Year: 2021).*

*Primary Examiner* — Hafiz A Kassim
(74) *Attorney, Agent, or Firm* — Vivacqua Crane, PLLC

(57) ABSTRACT

An interactive vehicle conjoint study survey system includes a first virtual machine including an application server operating a management program generating, modifying and saving conjoint environment survey content for access by a survey taker. A choice task content list is generated by the management program and is reviewed and completed by the survey taker. A reader program of the first virtual machine identifies survey taker choices selected from the choice task content list to be displayed. A survey taker interface is formatted to conform to an interface window completely displayed on a screen of a survey taker device defining a smart phone displays the survey taker choices.

11 Claims, 4 Drawing Sheets

(56) References Cited

U.S. PATENT DOCUMENTS

| | | | | |
|---|---|---|---|---|
| 2011/0034176 | A1* | 2/2011 | Lord | G06V 10/96 |
| | | | | 348/241 |
| 2012/0310585 | A1* | 12/2012 | Oliveira | B64F 5/60 |
| | | | | 702/119 |
| 2013/0018701 | A1* | 1/2013 | Dusig | G06Q 30/0261 |
| | | | | 705/14.19 |
| 2013/0275875 | A1* | 10/2013 | Gruber | G06F 3/167 |
| | | | | 715/728 |
| 2014/0278781 | A1* | 9/2014 | Liu | G06Q 30/0203 |
| | | | | 705/7.32 |
| 2016/0085302 | A1* | 3/2016 | Publicover | G02B 27/017 |
| | | | | 345/633 |
| 2016/0163217 | A1* | 6/2016 | Harkness | G09B 7/00 |
| | | | | 434/65 |
| 2016/0283676 | A1* | 9/2016 | Lyon | G06Q 40/08 |
| 2017/0053299 | A1* | 2/2017 | Rozga | G06Q 30/0203 |
| 2018/0040161 | A1* | 2/2018 | Tierney | G06F 3/015 |
| 2019/0107935 | A1* | 4/2019 | Spivack | G06Q 30/0277 |
| 2019/0133510 | A1* | 5/2019 | el Kaliouby | G08G 1/096725 |
| 2020/0013076 | A1* | 1/2020 | Rinzler | H04N 21/44218 |
| 2020/0310764 | A1* | 10/2020 | Djaafri | G06F 11/3684 |
| 2021/0174590 | A1* | 6/2021 | Huet | B60R 16/0231 |

\* cited by examiner

INTERACTIVE CONJOINT ENVIRONMENT

The present disclosure relates to systems and methods to generate and refine vehicle data conjoint surveys.

Current vehicle conjoint study surveys are used by vehicle designers during a vehicle design phase to understand the voice of prospective customers and how they make tradeoffs between item choices including product features and feature prices for vehicle manufactures to price features and to help determine features to be included in different vehicles. Current vehicle conjoint study surveys are conducted on-line using personal computers (PC)s. Presentations are commonly administered by third party contractors or vendors who identify potential survey takers and use computer station monitors and lap-top computer screens which are large enough to present multiple volumes of vehicle data. Current vehicle conjoint study surveys, however, do not generalize well when deployed on small-screen mobile devices. In-survey quality may also be diminished by survey taker behavior known to diminish response quality.

Survey taker behavior impacts survey completion rates which may be diminished due to survey taker early drop-out and includes reduced choice tasks dwell time and tap and drag actions. Current vehicle conjoint studies lack placement and frequency of sensory feedback. Current vehicle conjoint studies also suffer from survey taker task comprehension resulting in survey taker boredom, diminished attention, and reduced choice task engagement. At present, survey takers cannot participate in conjoint study surveys using survey taker preferred devices including mobile devices such as mobile phones because current vehicle conjoint studies now presented on large displays such as on personal computer screens and monitors do not generalize well on known mobile devices, therefore limiting the possible pool size of prospective survey takers.

Thus, while current systems and methods to perform vehicle conjoint studies achieve their intended purpose, there is a need for a new and improved system and method to generate and actively refine vehicle conjoint studies.

SUMMARY

According to several aspects, an interactive conjoint study survey system includes a first virtual machine including an application server operating a management program generating, modifying and saving a conjoint environment survey content for access by a survey taker. A choice task content list is generated by the management program and is reviewed and completed by the survey taker. A reader program of the first virtual machine identifies multiple survey taker choices selected from the choice task content list to be displayed. A survey taker interface displays the multiple survey taker choices, the survey taker interface being formatted to conform to an interface window completely displayed on a screen of a survey taker device defining a smart phone.

In another aspect of the present disclosure, a vendor program database collects information for a conjoint environment survey of data including data provided by a manufacturer enabling the survey taker via a programming function to access the first virtual machine.

In another aspect of the present disclosure, a second virtual machine forwards data requests to and retrieves conjoint environment survey data from the second virtual machine.

In another aspect of the present disclosure, the second virtual machine includes a database of developmental vehicle data for a vehicle under development including a vehicle attribute list and descriptions of features and options available in the vehicle under development and listed on the choice task content list.

In another aspect of the present disclosure, a data collection link includes camera image data and facial data, wherein applying input data of the survey taker via the data collection link including multiple survey taker camera image data and multiple survey taker facial data, the API using the management program identifies when and if a communication signal as a wireless or a wired transfer of data is forwarded to the survey taker device.

In another aspect of the present disclosure, a device notification is generated in response to the communication signal and is presented on the interface window or on the survey taker device, the device notification including at least one of a haptic notification and an indicator light including a blinking or a steady light on the interface window or on the survey taker device to notify the survey taker that additional attention needs to be paid to the conjoint environment survey content.

In another aspect of the present disclosure, if the management program identifies the survey taker has met a predetermined threshold of distraction, boredom, eye-vision wander, response error, or inattention, the device notification defines a rest screen.

In another aspect of the present disclosure, an application programming interface (API) of the first virtual machine receives information including but not limited to the multiple survey taker choices, a survey taker focus status, survey taker eye-tracking data, timing or latency data for the survey taker to respond to data choices presented, indication of survey taker distraction or an indication of survey taker misunderstanding of a conjoint environment survey question such as repetition of a same response.

In another aspect of the present disclosure, a first camera is provided for the survey taker device, the management program receiving data from the first camera, wherein camera images and survey taker features are applied using the management program to monitor eye movement of the survey taker to define eye-tracking data indicating survey taker attentiveness or distraction from accomplishing the survey, and visual cues of the survey taker including facial features representing survey taker distraction.

In another aspect of the present disclosure, the survey taker interface is further formatted to conform to being displayed on a viewing screen of a personal computer (PC).

According to several aspects, a method to perform a vehicle interactive conjoint study survey comprises: operating a management program to generate, modify and save conjoint environment survey content for access by a survey taker; generating a choice task content list using the management program to be reviewed and completed by the survey taker; sending information including multiple survey taker choices, a survey taker focus status, survey taker eye-tracking data, timing or latency data for the survey taker to respond to data choices presented, indication of survey taker distraction or an indication of survey taker misunderstanding of a conjoint environment survey question such as repetition of a same response to an application programming interface (API); monitoring the survey taker with the API and using the management program to identify when and if a communication signal is forwarded to a survey taker device; and generating a device notification in response to the communication signal and presenting the device notification on the survey taker device.

In another aspect of the present disclosure, the method further includes displaying the multiple survey taker choices on a survey taker interface of the survey taker device.

In another aspect of the present disclosure, the method further includes formatting the survey taker interface to conform to an interface window completely displayed on a screen of the survey taker device defining a smart phone.

In another aspect of the present disclosure, the method further includes providing the survey taker interface with multiple choice tasks for selection by the survey taker to retain an interest and concentration of the survey taker including at least one of: identifying the multiple choice tasks on a wedge-choice wheel presented in a wedge design having a circular wheel design; identifying the multiple choice tasks on an angular-choice wheel having angular rings in a circular wheel design with features presented on multiple wedges; and identifying the multiple choice tasks on a polygon-shaped choice wheel having different polygons presented on vertices having annular rings with individual ones of the annular rings successively numbered.

In another aspect of the present disclosure, the method further includes applying camera image data and facial data as input data of the survey taker.

In another aspect of the present disclosure, the method further includes: generating the device notification as a haptic notification or an indicator light including a blinking or a steady light on the survey taker device to notify the survey taker that additional attention needs to be paid to the conjoint environment survey program; and conforming the device notification as a rest screen if the management program identifies the survey taker has met a predetermined threshold of distraction, boredom, eye-vision wander, response error or inattention.

In another aspect of the present disclosure, the method further includes actuating a reader program to identify survey taker choices selected from the choice task content list to be displayed.

According to several aspects, a method to perform a vehicle interactive conjoint study survey comprises: operating a management program to generate, modify and save a conjoint environment survey content for access by a survey taker; generating a choice task content list using the management program to be reviewed and completed by the survey taker; monitoring eye movement of the survey taker to define eye-tracking data indicating survey taker attentiveness or distraction from accomplishing a survey, and evaluating visual cues of the survey taker including facial features representing survey taker distraction and using the management program to identify when and if a communication signal is forwarded to a survey taker device; creating in-survey task breaks in response to measured behaviors of the survey taker to allow time off for the survey taker to relax prior to completing the survey; measuring survey taker in-survey focused attention and choice task survey taker engagement; and generating a device notification and presenting the device notification on the survey taker device.

In another aspect of the present disclosure, the method further includes sending survey user information including survey taker selections, a survey taker focus status, survey taker eye-tracking data, timing or latency data for the survey taker to respond to data choices presented, indication of survey taker distraction or an indication of survey taker misunderstanding of a conjoint environment survey question such as repetition of a same response to an application programming interface (API).

In another aspect of the present disclosure, the method further includes measuring a survey user response pattern including the survey taker repeatedly selecting a first-choice profile regardless of option content, eye-tracking including prolonged eye movement away from a device interface window, and interactive behaviors indicative of reduced attention including reduced dwell time in responding to choices.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
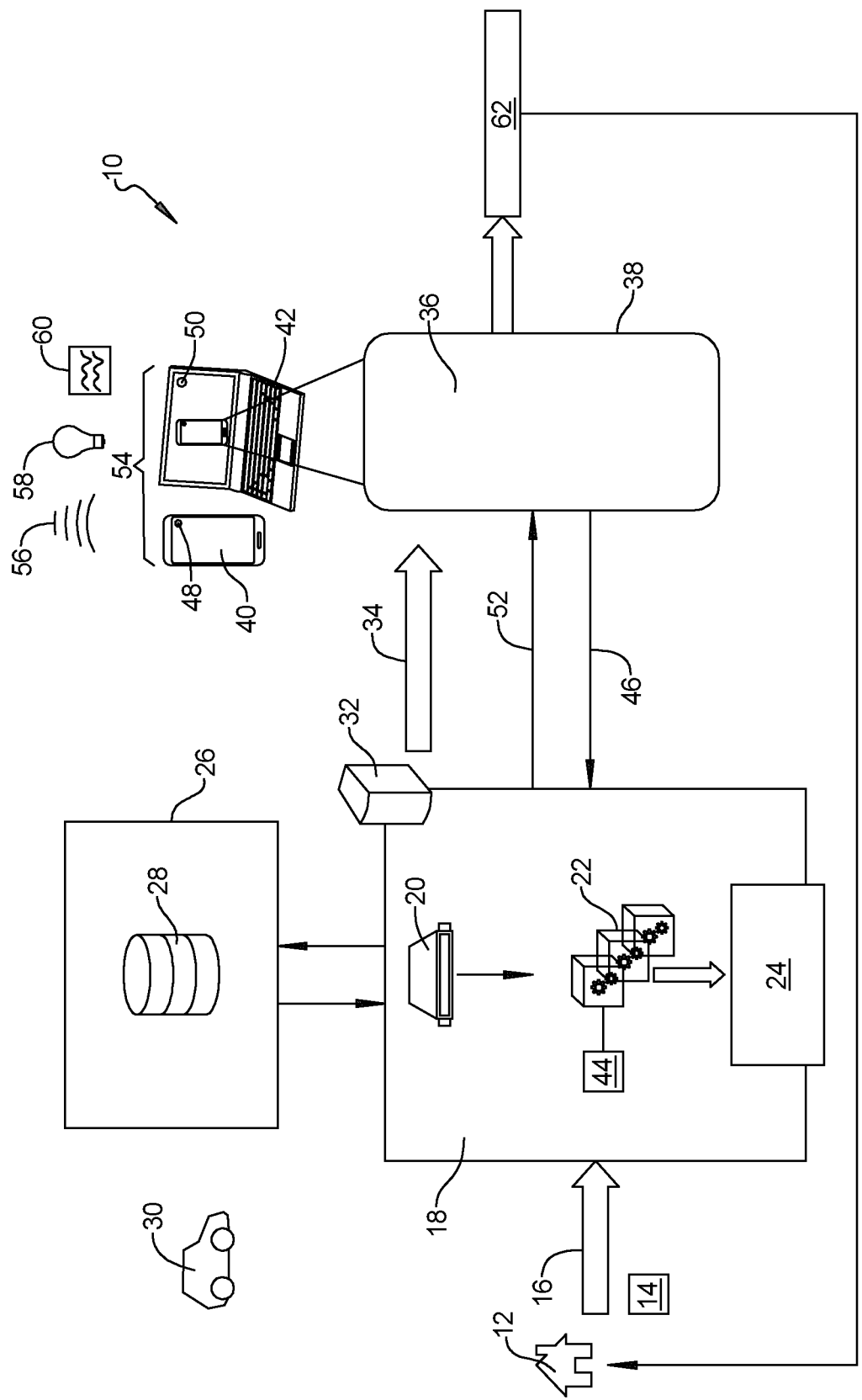
FIG. 1 is a flow diagram of a vehicle interactive conjoint study survey system according to an exemplary aspect.

Referring to FIG. 1, an interactive conjoint study survey system 10 provides a vendor program database having a home page 12 collecting information from which a vendor conducting a conjoint environment survey of vehicle data such as data provided by an automobile manufacturer enables a survey taker 14 via a programming function 16 to access a first virtual machine 18. The first virtual machine 18 includes an application server 20 operating a management program 22 which generates, modifies and saves a conjoint environment survey content for access by the survey taker 14 and the vendor. The management program 22 generates a choice task content list 24 to be reviewed and completed by the survey taker 14. The first virtual machine 18 forwards data requests to and retrieves vehicle conjoint environment survey data from a second virtual machine 26. The second virtual machine 26 includes a database 28 of developmental vehicle data for a vehicle 30 under development including a vehicle attribute list and descriptions of features and options which may be available in the vehicle being designed and which are listed on the choice task content list 24.

A reader program 32 of the first virtual machine 18 identifies multiple survey taker choices selected from the choice task content list 24 to be displayed which are forwarded by a choice code 34 to a survey taker interface 36. The survey taker interface 36 is formatted to conform to an interface window 38 which may be completely displayed on a screen of a survey taker device 40 shown such as a smart phone or displayed on a viewing screen of a personal computer (PC) 42 such as a PC monitor or a lap-top computer viewing screen also shown.

The computer including the PC 42 described in reference to FIG. 1 is a non-generalized, electronic control device having a preprogrammed digital controller or processor, memory or non-transitory computer readable medium used to store data such as control logic, software applications, instructions, computer code, data, lookup tables, etc., and a transceiver or input/output ports. The computer readable medium includes any type of medium capable of being accessed by a computer, such as read only memory (ROM), random access memory (RAM), a hard disk drive, a compact disc (CD), a digital video disc (DVD), or any other type of memory. The non-transitory computer readable medium excludes wired, wireless, optical, or other communication links that transport transitory electrical or other signals. The non-transitory computer readable medium includes media where data can be permanently stored and media where data can be stored and later overwritten, such as a rewritable optical disc or an erasable memory device. Computer code includes any type of program code, including source code, object code, and executable code.

An application programming interface (API) 44 of the first virtual machine 18 via a data collection link 46 which may be transferred wirelessly or via a wire connection receives information including but not limited to survey taker selections, a survey taker focus status, survey taker eye-tracking data, timing or latency data for the survey taker 14 to respond to data choices presented, indication of survey taker distraction or an indication of survey taker misunderstanding of a conjoint environment survey question such as repetition of a same response and the like. According to several aspects the management program 22 receives data from a first camera 48 of the survey taker device 40 or from a second camera 50 of the PC 42. Camera images and survey taker features may be applied using software of the management program 22 to monitor eye movement of the survey taker 14 to define eye-tracking data indicating survey taker attentiveness or distraction from accomplishing the survey, and visual cues of the survey taker 14 such as facial features representing survey taker distraction, and the like.

Applying input data of the survey taker 14 via the data collection link 46 including camera image data and facial data, the API 44 using the management program 22 monitors the survey taker 14 and identifies when and if a communication signal 52 as a wireless or a wired transfer of data is forwarded to the survey taker device 40 or the PC 42. A device notification 54 may be generated in response to the communication signal 52, which may be presented on the interface window 38 or elsewhere on one of the survey taker device 40 or the PC 42 as described below. The device notification 54 may take a form such as a haptic notification 56 or an indicator light 58 such as a blinking or a steady light on the interface window 38 or on one of the survey taker device 40 or the PC 42 which notifies the survey taker 14 that additional attention needs to be paid to the conjoint environment survey program. If the management program 22 identifies the survey taker 14 has met a predetermined threshold of distraction, boredom, eye-vision wander, response error, inattention or the like, the device notification 54 may also take the form of a rest screen 60. The rest screen 60 may for example include a non-conjoint environment survey screen, a music video, a relaxation video, or the like which functions for a predetermined period of time to allow the survey taker 14 to regain concentration allowing subsequent completion of the conjoint environment survey. Upon completion of the conjoint environment survey, a survey completion signal 62 is generated which returns the survey taker 14 and forwards results of the conjoint environment survey to the vendor program database home page 12.

Referring generally to FIGS. 2 through 4 and again to FIG. 1, according to several aspects, to further retain the interest and concentration of the survey taker 14, the survey taker interface 36 may be provided with multiple different varieties of choice tasks for selection by the survey taker 14. With more specific reference to FIG. 2, a first-choice task screen 64 may define a wedge-choice wheel 66 identifying multiple choice tasks presented in a wedge design of multiple colors having a circular wheel representation. In a first wedge presentation, the wedge-choice wheel 66 may include for example a first wheel segment 68 presenting a first vehicle package of features defining for example a red vehicle color, no sunroof, front-wheel drive, a 180 horsepower (HP) engine, a 7-inch infotainment screen size, no tow package, a 38 mile per gallon (MPG) gas mileage and a 2.4 L engine size.

In a second wedge presentation the wedge-choice wheel 66 may include for example a second wheel segment 70 presenting a second vehicle package of features defining for example an orange vehicle color, no sunroof, front-wheel drive, a 180 HP engine, a 10-inch infotainment screen size, no tow package, a 24 mile per gallon (MPG) gas mileage and a 1.8 L engine size. In a third wedge presentation the wedge-choice wheel 66 may include for example a third wheel segment 72 presenting a third vehicle package of features defining for example a white vehicle color, a sunroof, front-wheel drive, a 180 HP engine, a 10-inch infotainment screen size, a tow package, a 48 mile per gallon (MPG) gas mileage and a 1.6 L engine size. In a fourth wedge presentation the wedge-choice wheel 66 may include for example a fourth wheel segment 74 presenting a fourth vehicle package of features defining for example a grey vehicle color, a sunroof, all-wheel drive, a 200 HP engine, a 7-inch infotainment screen size, no tow package, a 32 mile per gallon (MPG) gas mileage and a 2.4 L engine size.

It is noted the wedge-choice wheel 66 provides one example of feature selections. Multiple other feature selection configurations, quantity of wedges, types and multiple different color combinations may also be used without limiting the scope of the present disclosure.

Upon selection of the exemplary second one of the first, second, third and fourth wheel segments of vehicle packages identified above defining the second wheel segment 70, a summary screen 76 is presented having the vehicle features identified for the second wheel segment 70 in a column format. A vehicle price 78 is also presented for this vehicle package of features from which the survey taker 14 may further refine a vehicle feature package choice. A question 80 is presented to the survey taker 14 to identify whether the survey taker 14 would or would not purchase the selected vehicle if the vehicle was real and the features of the exemplary selected first wheel segment 68 are all found to be acceptable. In the example provided in FIG. 2, the survey taker 14 has selected a YES response to the question 80. The survey taker 14 may then select a back button 82 to return to a previous screen or a next button 84 to move forward with a next vehicle package selection.

Figure 2:
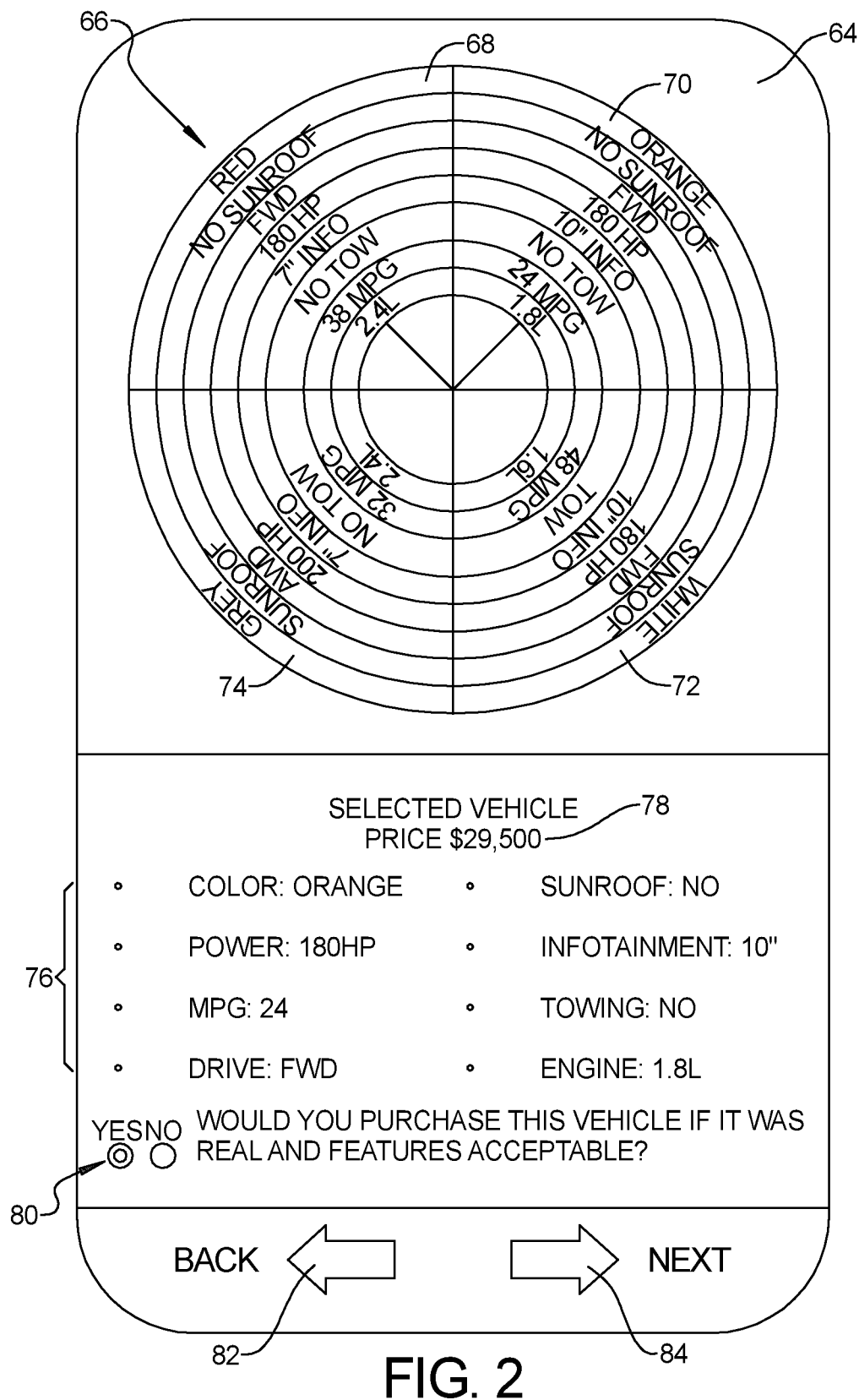
FIG. 2 is a front elevational view of a task screen defining a wedge-choice wheel identifying multiple choice tasks for the system of FIG. 1.

Referring to FIG. 3 and again to FIG. 2, a second-choice task screen 86 may define an angular-choice wheel 88 identifying multiple choice tasks presented having angular rings in a circular wheel design with features presented on multiple wedges and in multiple colors. In a first ring segment 90, the angular-choice wheel 88 may include for example multiple engine HP selections arranged in concentric order toward a center of the angular-choice wheel 88. In a second ring segment 92, the angular-choice wheel 88 may include for example multiple vehicle average mile-per-gallon selections arranged in concentric order toward a center of the angular-choice wheel 88.

Figure 3:
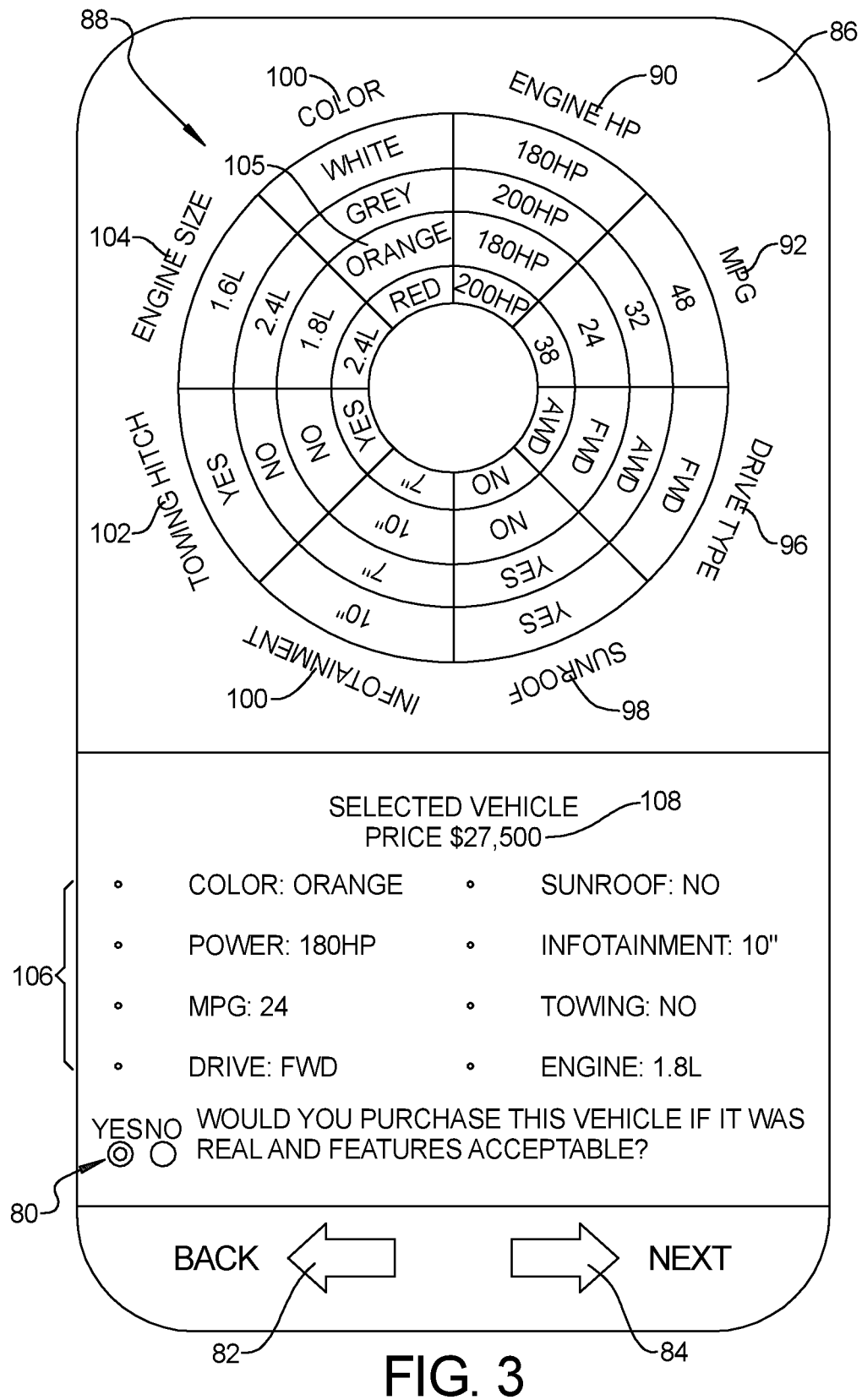
FIG. 3 is a front elevational view of a task screen defining an angular-choice wheel identifying multiple choice tasks presented having angular rings for the system of FIG. 1.
Figure 4:
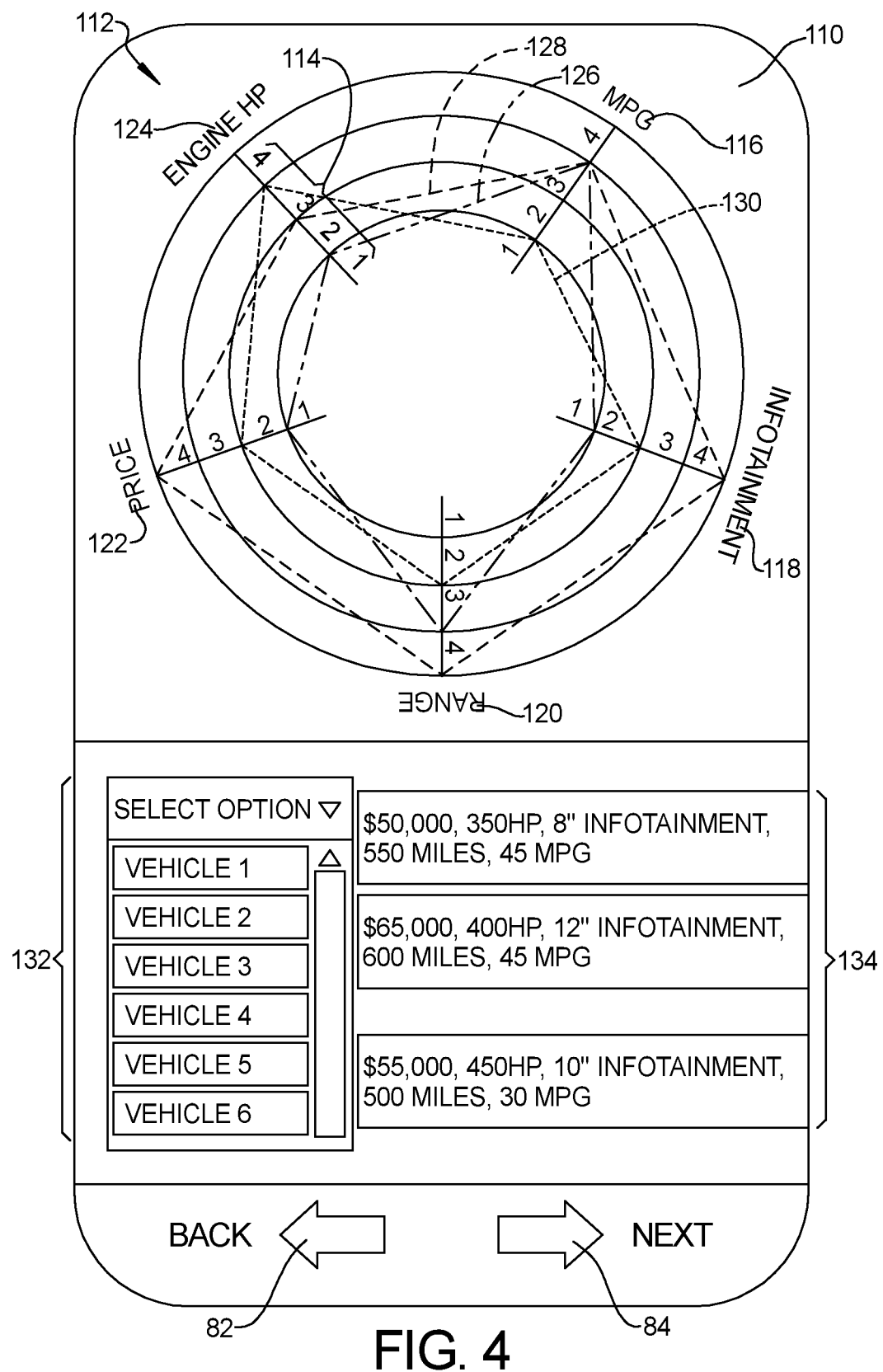
FIG. 4 is a front elevational view of a task screen defining a wedge-choice wheel identifying multiple choice tasks for the system of FIG. 1.

With continuing reference to FIG. 3, in a third ring segment 96, the angular-choice wheel 88 may include for example multiple drive type selections arranged in concentric order toward a center of the angular-choice wheel 88. In a fourth ring segment 98, the angular-choice wheel 88 may include for example multiple sunroof selections arranged in concentric order toward a center of the angular-choice wheel 88. In a fifth ring segment 100, the angular-choice wheel 88 may include for example multiple infotainment screen size selections arranged in concentric order toward a center of the angular-choice wheel 88. In a sixth ring segment 102, the angular-choice wheel 88 may include for example multiple towing hitch selections arranged in concentric order toward a center of the angular-choice wheel 88. In a seventh ring segment 104, the angular-choice wheel 88 may include for example multiple engine size selections arranged in concentric order toward a center of the angular-choice wheel 88. Multiple rings such as an exemplary ring 105 provide combined features for the multiple ring segments.

Similar to the summary screen 76 of FIG. 1, a summary screen 106 is presented having the vehicle features identified for the exemplary ring 105 are presented in a column format. A vehicle price 108 is also presented for this vehicle package of features from which the survey taker 14 may further refine a vehicle feature package choice. Similar to FIG. 1, the question 80 is presented to the survey taker 14 and the survey taker 14 may then select the back button 82 to return to a previous screen or the next button 84 to move forward with a next vehicle package selection.

It is noted the angular-choice wheel 88 provides one example of feature selections. Multiple other feature selection configurations, quantity or rings, types and multiple different color combinations may also be used without limiting the scope of the present disclosure.

Referring to FIG. 4 and again to FIGS. 2 through 3, a third-choice task screen 110 defines a choice wheel 112 identifying multiple features in a circular wheel design having different features positioned about a circumference of the choice wheel 112. Individual rings are provided within the choice wheel 112 distinguishing different feature values for individual ones of the features selected and are successively numbered such as 1, 2, 3, 4 as shown. Individual packages of vehicle feature selections may be identified using multiple different polygons with selected vehicle features identified by contact of individual polygon vertices with individual ones of the annular rings 114. The multiple feature selections may include for example a fuel economy or MPG 116, an infotainment package 118, a range 120, a price 122 and an engine horsepower (HP) 124. Feature values selected on individual rings 114 are identified by contact of individual vertices of multiple polygons which provide multiple options based on the survey taker 14 choices.

An exemplary first polygon 126 identifies multiple selected options by contact of individual vertices of the first polygon 126 with individual ones of the rings 114 defining different selected values of the fuel economy or MPG 114, the infotainment package 118, the range 120, the price 122 and the engine horsepower (HP) 124. An exemplary second polygon 128 identifies multiple selected options by contact of individual vertices of the second polygon 128 with individual ones of the rings 114 defining different selected values of the fuel economy or MPG 114, the infotainment package 118, the range 120, the price 122 and the engine horsepower (HP) 124. An exemplary third polygon 130 identifies multiple selected options by contact of individual vertices of the third polygon 130 with individual ones of the rings 114 defining different selected values of the fuel economy or MPG 114, the infotainment package 118, the range 120, the price 122 and the engine horsepower (HP) 124.

Initially, a select vehicle choice field 132 permits the survey taker 14 to make choices of available options between multiple vehicle packages, by selecting a vehicle 1, a vehicle 2, a vehicle 3, a vehicle 4, a vehicle 5 and the like. For any vehicle selected from the select vehicle choice field 132, one of multiple feature packages 134 listing the features of the selected vehicle are identified by one of the above noted polygons. For example, by selecting vehicle 1 from the vehicle choice field 132 the values identified by the first polygon 126 are identified, by selecting vehicle 2 from the vehicle choice field 132 the values identified by the second polygon 128 are identified, and by selecting vehicle 5 from the vehicle choice field 132 the values identified by the third polygon 130 are identified. Similar to FIG. 1, the survey taker 14 may then select the back button 82 to return to a previous screen or the next button 84 to move forward with a next vehicle package selection.

It is noted the choice wheel 112 provides one example of feature selections. Multiple other feature selection configurations, quantity or rings, quantity of polygons presented and multiple different color combinations may also be used without limiting the scope of the present disclosure.

According to several aspects, the system and method of the present disclosure is based on a process to manage information flow between vehicle experimental designs, choice task rendering which is device/respondent dependent, choice responses, in-survey engagement, and sensory feedback control mechanisms. A process selects choice task rending amongst several interface designs optimized for use on a small-scale screen based on a survey taker device, characteristics and identified preferences. The present system design has further interactive options including but not limited to rotation, rollover, zoom in/out and color-highlighting.

Wedge-choice wheels of the present disclosure present choice tasks as wedges in a circular wheel representation with features as angular rings. Angular-choice wheels of the present disclosure present choice tasks as angular rings in a circular wheel representation having vehicle features on wedges. Polygon-choice wheels of the present disclosure present choice tasks as polygons with features on vertices of the polygons.

The present disclosure provides a process or method to measure in-survey interactive behaviors indicative of early survey drop-out propensity including reduced dwell time, number and location of drags, selections and rotations. The present process creates in-survey task breaks in response to measured behaviors to allow time off for a survey taker to relax prior to completing the survey. The location, frequency and content of task breaks may be based on predetermined rules and in-survey measurement levels. The present process also measures survey taker in-survey focused attention and choice task survey taker engagement including a response pattern, for example a survey taker repeatedly selecting a first-choice profile regardless of option content, eye-tracking including prolonged eye movement away from a device interface window, and interactive behaviors indicative of reduced attention including reduced dwell time in responding to choices. The present process induces sensory feedback through visual means including blinking lights, pop-up messages, auditory sounds such as beeps, and haptic vibration mechanisms. The placement and frequency of sensory feedback is determined based on a combination of predetermined rules and strength of in-survey measurements.

The present process and method dynamically determines design elements such as a font size, a number of choice tasks, and sizes of angular, wedge and polygon representations based on physical characteristics of the electronic device used including a screen size; a model of interaction, and use of a mouse or a finger. The present disclosure may be applied to perform conjoint study surveys for vehicle package selection, for eliciting prospective consumer preferences and for forecasting future items such as vehicle packaging.

An interactive conjoint study survey system 10 of the present disclosure offers several advantages. These include a methodology to increase pre-survey response by selecting amongst several interface designs optimized for use on a small-scale screen such as a smart phone-based survey taker device. A control mechanism applied using an application program and an application programming interface increases survey response rate amongst prospective survey takers with a known predispositions toward election to use mobile devices in lieu of portable computers. This provides representativeness of conjoint studies with respect to a target population by capturing a broader selection of prospective survey respondents. The present system and method also improve in-survey quality by measuring survey taker behavior known to diminish response quality, that impact a completion rate. The present system and method also measures survey taker behaviors indicative of early drop-out, including reduced choice tasks dwell time and tap/drag actions. Early drop-out is mitigated through several sensory feedback control mechanisms, including visual mechanisms including blinking lights and pop-up messages, auditory sounds including beeps, and haptic feedback such as device vibration. A placement and frequency of sensory feedback is determined based on a combination of fixed rules and strength of in-survey measurements.

The present system and method also enhances task comprehension by measuring survey taker behavior indicative of boredom, diminished attention, and reduced choice task engagement. These deleterious behaviors may be mitigated through the control mechanism of a task break, which is an image or exercise unrelated to the conjoint choice exercise that is shown to a survey taker at different points in the conjoint survey. A survey location and a frequency of task breaks are determined using predetermined rules and measure a degree of reduction in focused attention and engagement.

The interactive conjoint study survey system 10 of the present disclosure resolves problems unique to the field of generating and refining vehicle data conjoint surveys including lack of a system and method which may be presented to a survey taker on a reduced screen size such as a smart phone. The claimed interactive conjoint study survey system 10 effectuates an improvement over the known systems and methods by use of a first virtual machine including an application server operating a management program to generate, modify and save a conjoint environment survey content for access by a survey taker. A choice task content list is generated by the management program and is reviewed and completed by the survey taker. A reader program of the first virtual machine identifies multiple survey taker choices selected from the choice task content list to be displayed. A survey taker interface displays the multiple survey taker choices, with the survey taker interface being formatted to conform to an interface window completely displayed on a screen of a survey taker device defining a smart phone. The interactive conjoint study survey system 10 further provides representativeness of conjoint studies with respect to a target population by capturing a broader selection of prospective survey respondents to improve in-survey quality by measuring survey taker behavior known to diminish response quality, that impact a completion rate. The system monitors the survey taker with an application programming interface (API) and identifies when and if a communication signal is forwarded to the survey taker device to help eliminate bad surveys due to survey taker distraction or early dropout. Processing time is reduced and data storage resources are saved by preemptively rejecting bad surveys.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An interactive conjoint study survey system, comprising:
   a first virtual machine including an application server operating a management program generating, modifying and saving a conjoint environment survey content for access by a survey taker;
   a choice task content list generated by the management program and reviewed and completed by the survey taker;
   a reader program of the first virtual machine identifying multiple survey taker choices selected from the choice task content list to be displayed;
   a survey taker interface displaying the multiple survey taker choices, the survey taker interface being formatted to conform to an interface window completely displayed on a screen of a survey taker device defining a smart phone and the survey taker interface having multiple choice tasks for selection by the survey taker to retain an interest and concentration of the survey taker including displaying the multiple choice tasks on a plurality of circular wheel wedges presented in a circular wheel design of the survey taker interface;
   a data collection link including camera image data and facial data wherein applying input data of the survey taker via the data collection link including multiple survey taker camera image data and multiple survey taker facial data, the API using the management program identifies when and if a communication signal as a wireless or a wired transfer of data is forwarded to the survey taker device;
   a first camera of the survey taker device wherein the management program receives the camera image data and the facial data from the first camera, wherein camera images and survey taker features are applied using the management program to monitor eye movement of the survey taker to define eye-tracking data indicating survey taker attentiveness or distraction from accomplishing the survey, and visual cues of the survey taker including facial features representing survey taker distraction from accomplishing the survey, to identify that the survey taker has met a predetermined threshold of distraction, boredom, eye-vision wander, response error, or inattention; and
   a device notification generated in response to the communication signal and presented on the interface window or on the survey taker device, the device notification including at least one of a haptic notification and an indicator light including a blinking or a steady light on the interface window or on the survey taker device to notify the survey taker that additional attention needs to be paid to the conjoint environment survey content, and wherein the device notification defines a rest screen when the management program identifies the survey taker has met the predetermined threshold of distraction, boredom, eye-vision wander, response error, or inattention.

2. The interactive conjoint study survey system of claim 1, including
a vendor program database collecting information for a conjoint environment survey of data including data provided by a manufacturer enabling the survey taker via a programming function to access the first virtual machine.

3. The interactive vehicle conjoint study survey system of claim 2, including a second virtual machine, the first virtual machine forwarding data requests to and retrieving conjoint environment survey data from the second virtual machine.

4. The interactive conjoint study survey system of claim 3, wherein the second virtual machine includes a database of vehicle developmental data including an attribute list and descriptions of features and options available in a vehicle under development and listed on the choice task content list.

5. The interactive conjoint study survey system of claim 1, including an application programming interface (API) of the first virtual machine receiving information including but not limited to the multiple survey taker choices, a survey taker focus status, survey taker eye-tracking data, timing or latency data for the survey taker to respond to data choices presented, indication of survey taker distraction or an indication of survey taker misunderstanding of a conjoint environment survey question such as repetition of a same response.

6. The interactive conjoint study survey system of claim 1, wherein the survey taker interface is further formatted to conform to being displayed on a viewing screen of a personal computer (PC).

7. A method to perform a vehicle interactive conjoint study survey, comprising:
operating a management program to generate, modify and save conjoint environment survey content for access by a survey taker;
generating a choice task content list using the management program to be reviewed and completed by the survey taker;
monitoring eye movement of the survey taker to define eye-tracking data indicating survey taker attentiveness or distraction from accomplishing the survey using a first camera of the survey taker device, and evaluating visual cues of the survey taker including facial features representing survey taker distraction from accomplishing the survey and the management program to identify that the survey taker has met a predetermined threshold of distraction, boredom, eye-vision wander, response error, or inattention;
sending information including multiple survey taker choices, a survey taker focus status, survey taker eye-tracking data, timing or latency data for the survey taker to respond to data choices presented, indication of survey taker distraction or an indication of survey taker misunderstanding of a conjoint environment survey question including repetition of a same response to an application programming interface (API);
displaying the multiple survey taker choices on a survey taker interface of the survey taker device;
formatting the survey taker interface to conform to an interface window completely displayed on a screen on the survey taker device defining a smart phone;
providing the survey taker interface having multiple choice tasks for selection by the survey taker to retain an interest and concentration of the survey taker including displaying the multiple choice tasks on a plurality of circular wheel wedges presented in a circular wheel design of the survey taker interface;
monitoring the survey taker with the API and using the management program to identify when and if a communication signal is forwarded to a survey taker device;
generating a device notification in response to the communication signal and presenting the device notification on the survey taker device as a haptic notification or an indicator light including a blinking or a steady light on the survey taker device to notify the survey taker that additional attention needs to be paid to the conjoint environment survey program; and
conforming the device notification as a rest screen when the management program identifies the survey taker has met the predetermined threshold of distraction, boredom, eye-vision wander, response error or inattention.

8. The method of claim 7, further including applying camera image data and facial data as input data of the survey taker.

9. The method of claim 7, further including actuating a reader program to identify survey taker choices selected from the choice task content list to be displayed.

10. A method to perform a vehicle interactive conjoint study survey, comprising:
operating a management program to generate, modify and save a conjoint environment survey content for access by a survey taker;
generating a choice task content list using the management program to be reviewed and completed by the survey taker;
monitoring eye movement of the survey taker to define eye-tracking data indicating survey taker attentiveness or distraction from accomplishing a survey using a first camera of the survey taker device, and evaluating visual cues of the survey taker including facial features representing survey taker distraction and using the management program to identify when and if a communication signal is forwarded to a survey taker device and to identify that the survey taker has met a predetermined threshold of distraction, boredom, eye-vision wander, response error, or inattention;
sending survey user information including multiple survey taker choices, survey taker selections, a survey taker focus status, survey taker eye-tracking data, timing or latency data for the survey taker to respond to data choices presented, indication of survey taker distraction or an indication of survey taker misunderstanding of a conjoint environment survey question such as repetition of a same response to an application programming interface (API);
displaying the multiple survey taker choices on a survey taker interface of the survey taker device;
formatting the survey taker interface to conform to an interface window completely displayed on a screen on the survey taker device defining a smart phone;
providing the survey taker interface having multiple choice tasks for selection by the survey taker to retain an interest and concentration of the survey taker including displaying the multiple choice tasks on a plurality of circular wheel wedges presented in a circular wheel design of the survey taker interface;

monitoring the survey taker with the API and using the management program to identify when and if a communication signal is forwarded to a survey taker device;

creating in-survey task breaks in response to measured behaviors of the survey taker to allow time off for the survey taker to relax prior to completing the conjoint environment survey;

measuring survey taker in-survey focused attention and choice task survey taker engagement;

generating a device notification and presenting the device notification on the survey taker device as a haptic notification or an indicator light including a blinking or a steady light on the survey taker device to notify the survey taker that additional attention needs to be paid to the conjoint environment survey program; and conforming the device notification as a rest screen when the management program identifies the survey taker has met the predetermined threshold of distraction, boredom, eye-vision wander, response error or inattention.

11. The method of claim 5, further including measuring a survey user response pattern including the survey taker repeatedly selecting a first-choice profile regardless of option content, eye-tracking including prolonged eye movement away from a device interface window, and interactive behaviors indicative of reduced attention including reduced dwell time in responding to choices.

* * * * *